H. P. SMITH.
HAIRPIN SEPARATING AND MEASURING MACHINE.
APPLICATION FILED JULY 20, 1920.

1,406,587.

Patented Feb. 14, 1922.
3 SHEETS—SHEET 2.

Homer P. Smith

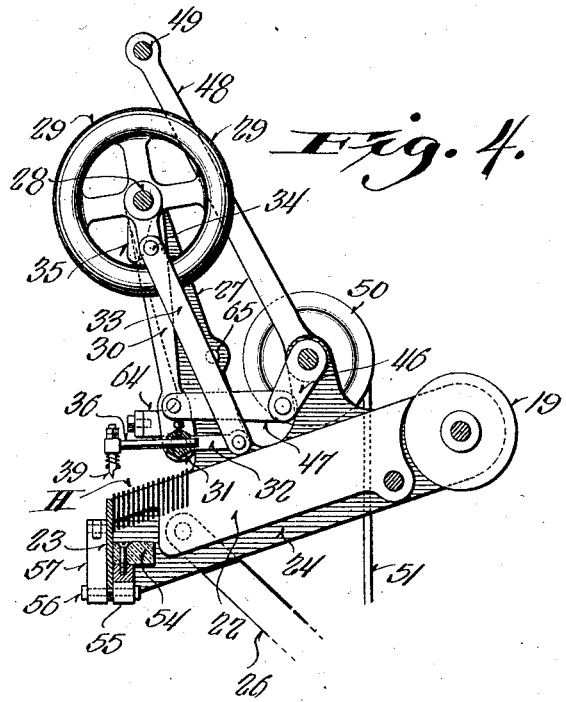

UNITED STATES PATENT OFFICE.

HOMER P. SMITH, OF APPLETON, WISCONSIN, ASSIGNOR TO SCOLDING LOCKS HAIRPIN COMPANY, OF APPLETON, WISCONSIN.

HAIRPIN SEPARATING AND MEASURING MACHINE.

1,406,587.          Specification of Letters Patent.       Patented Feb. 14, 1922.

Application filed July 20, 1920. Serial No. 397,607.

*To all whom it may concern:*

Be it known that I, HOMER P. SMITH, a citizen of the United States, and resident of Appleton, in the county of Outagamie and State of Wisconsin, have invented certain new and useful Improvements in Hairpin Separating and Measuring Machines; and I do hereby declare that the following is a full, clear, and exact description thereof.

My invention relates to new and useful improvements in machines for separating and measuring quantities of hairpins so as to enable the same to be quickly packaged.

The primary object of this invention, is to provide a machine of this character which will be an improvement over the similar machine illustrated in my co-pending patent application Serial No. 268318, filed December 26, 1918.

In the machine disclosed in said application, I found that although there is considerable movement of the receiving end of the separating table, the movement at the discharge end thereof is so relatively slight that proper feeding of the disentangled hairpins through the table guideways is impaired. Therefore it is an object of this invention, to provide agitating means for the discharge end portion of the table whereby to increase the speed of movement of the hairpins, and in connection therewith is also employed a device which will automatically retard the speed of the movement of the hairpins in case the agitating means is too active.

A further important object of the invention, is to provide a simply constructed and readily operable counting means, whereby a desired number of hairpins may be separated from the supplies on the several magazine plates, a similar number of hairpins being simultaneously separated from the supplies on each of the said magazine plates. And in connection with this feature is used an arrangement for elevating the several selected groups of hairpins above the magazine plates, to facilitate the removal thereof.

An additional object of the the invention, is to provide a counting mechanism of such a nature that each one of the several successive steps in the operation thereof may be easily and quickly carried out in proper sequence by a single machine operator.

With these general objects in view, the invention resides in the novel features of construction, combination and arrangement of parts which will be hereinafter more particularly described and claimed.

In the accompanying drawings:

Figure 2 is a substantially horizontal section on the plane of the line 2—2 of Figure 1.

Figure 3 is an end elevational view, partly in section, of the machine parts illustrated in Figure 1.

Figure 4 is a detail longitudinal vertical sectional view through one end of the machine, said section being also taken substantially on the plane of the line 1—1 of Figure 3, and showing the counting mechanism in a different position from that shown in Figure 1, and Figure 5 is an enlarged longitudinal sectional view of a counting finger and associated parts.

Figure 1:
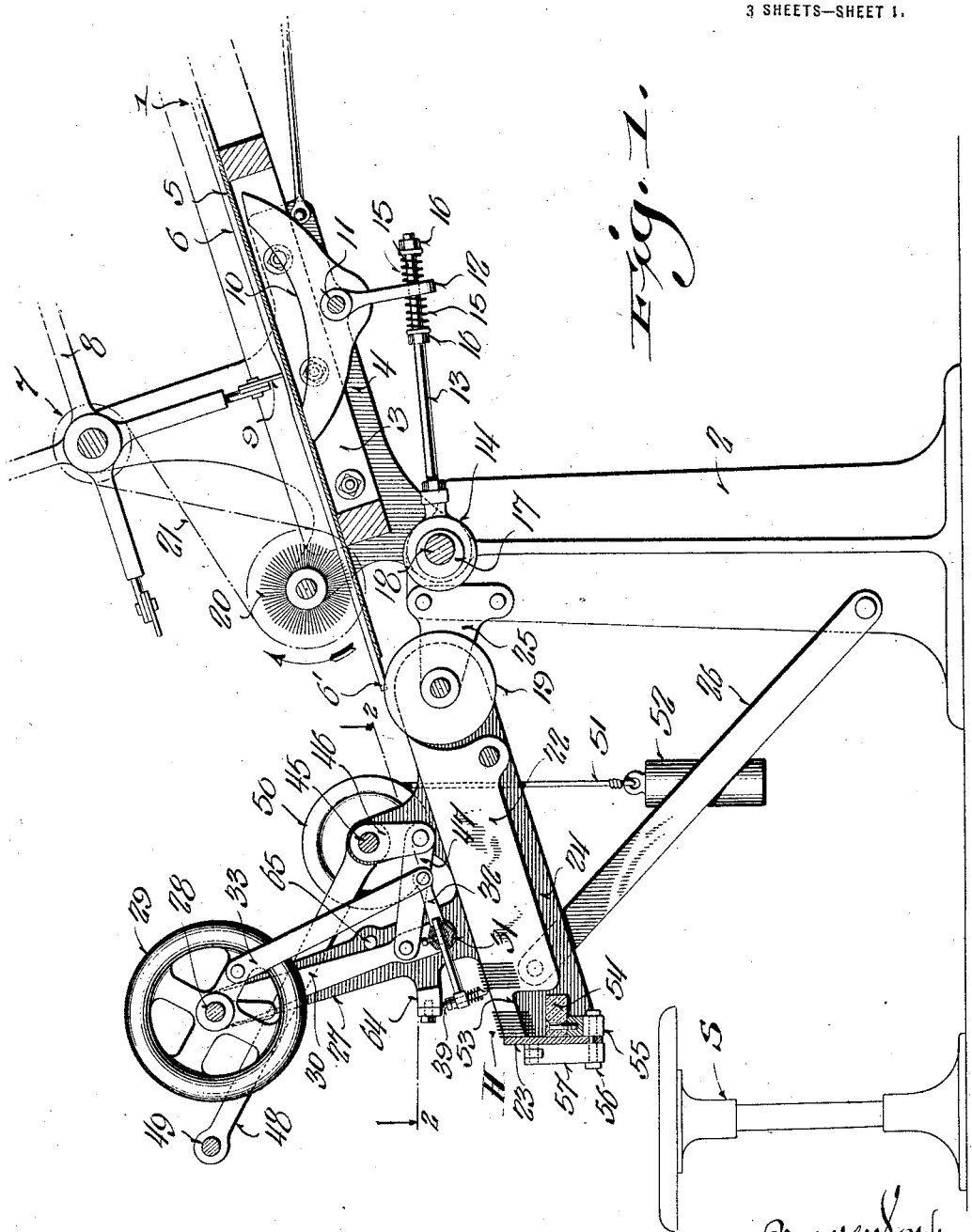
Figure 1 represents a vertical longitudinal sectional view, taken approximately on the plane of the line 1—1 of Figure 3.

In these drawings I have illustrated only so much of a hairpin separating and counting machine as is necessary to explain the present invention; reference may be had, if necessary, to the drawings and specification of the application hereinbefore referred to. Therefore, it is to be understood that the features of the present invention may be incorporated into different types of separating and counting machines, and that various changes may be made in the different parts as illustrated to permit the principles to be used not only in connection with hairpin machines, but also for separating and counting other articles of a somewhat similar nature.

Referring more specifically to the drawings, it will be noted that the separating table 1 is supported at one end on the upper end of a table support 2, and is inclined upwardly towards its receiving end (not shown). This table consists of a supporting frame 3, which is secured to a bracket 4, and has a bottom plate 5 on which are a series of longitudinally extending spaced and parallel ribs 6, the ends of said ribs being extended beyond the discharge end portion of the bottom plate 5, as indicated at 6', the ribs 6 thus defining longitudinal and parallel guideways down which hairpins are adapted to slide. Above the table 1 adjacent its discharge end is located a sweep mechanism 7, which includes radially extending sweep arms 8, having hairpin engaging fingers 9 on their free ends which are adapted to engage between the ribs 6. Also disposed adjacent this end of the separating table 1, but located beneath the same, is an agitating mechanism which consists of means for intermittently tapping the underside of the table bottom 5, so as to joggle the hairpins thereon. In its preferred embodiment this mechanism consists of an arcuate bar 10 secured intermediate its ends on a rock shaft 11, and having its opposite ends arranged to strike the bottom plate 5 at spaced points. A rocker arm 12 extends from the bar 10 or from the shaft 11, so as to provide means for oscillating the former, a rod 13 being slidable through an opening therein and having an eccentric strap 14 on one end. Surrounding the rod 13, on each side of the rocker arm 12 are expansile springs 15, the remote ends of which engage adjustable stops 16. An eccentric strap 14 is disposed around an eccentric 17 secured upon a rotating shaft 18 which may be used for driving of the parts of the machine.

By this arrangement the table bottom 5, at its discharge end is intermittently tapped by the opposite ends of the oscillatory bar 10 to keep the hairpins which are disposed within the guideways in motion, whereby to prevent a quantity of the same accumulating at this end of the table. In connection with this agitating mechanism I employ a means whereby the hairpins will reach a plurality of conveyor wheels 19, one of which is located at the end of each of the guideways between the ribs 6, at a uniform speed. In other words, the transversely disposed rotary brush roller 20 is located between the sweep mechanism 7 and the conveyor wheels 19, and the bristles of the brush lightly engage with the hairpins as the same pass thereunder. The sweep mechanism 7 and the brush roller 20 are operated simultaneously, but in opposite directions, they being connected by means of a sprocket chain or the like 21.

From each of the conveyor wheels 19, the hairpins are fed onto co-operating magazine plates 22, these plates being downwardly inclined toward the front end of the machine so that the hairpins will slide to the lower end. The downward movement of the hairpins, designated in the accompanying drawing by the character H, is limited by a transverse vertically positioned end plate 23, the same forming one part of a magazine frame 24, which frame is connected at its rear end to the upper end portion of the table support 2 by a bracket 25, the lower end being held in rigid position by braces 26.

The mechanism for simultaneously counting off a like number of hairpins on each of the magazine plates 22, is carried on the magazine frame 24 above said plates. At each side end of the frame 24 is an upstanding bracket arm 27, the upper ends of which are connected by a supporting brace rod 28, having a hand wheel 29 journally mounted in its central portion. This brace rod 28 also has a pair of hanger arms 30 oscillatorily journaled thereon adjacent the bracket arms 27, the lower ends of the hanger arms being connected by a carrying bar 31. A crank 32 projects rearwardly from the intermediate portion of the carrying bar 31, and has the lower end of a pitman 33 pivoted thereto, the upper end of said pitman being connected with one of the spokes of the handwheel 29 at a point spaced from the hub thereof. When these parts are inoperative they are arranged as indicated in Figure 4, a stop pin 34 carried by the handwheel 29 being then in engagement with a stop finger 35 fixed to the rod 28.

As is clearly shown in Figure 2, the carrying bar 31 extends transversely across the magazine plates 22 adjacent their lower end portions, and this bar is used for supporting a plurality of counting devices, one of which is designed for use with each of the magazine plates 22. The preferred embodiment of each of these counting devices is most clearly depicted in Figure 5, wherein one of the same is shown on an enlarged scale. That is to say each counting device consists of a supporting rod 36, disposed in a transverse opening 37 in the bar 31 and secured in adjusted positions therein by a set screw 38, and a counting finger 39. This finger is slidable through the bearing of a head 40 on the outer or free end of the rod 36, and extends transversely of the axis of the latter. Inasmuch as in the operation of the device the lower pointed end of the finger 39 is brought into engagement with the upper edge of its co-operating magazine plate 22, resilient cushioning means in the form of an expansile spring 41 is provided. This spring is located between the head 40, and a pin 42 extending transversely through the finger adjacent its lower end, the upper end portion thereof being threaded and provided with adjustable stop nuts 43. A key 44 extending into the bearing of the head 40 and into a keyway in the finger 39 prevents rotation thereof.

As will be appreciated from the drawings, the handwheel 29 is used for moving the several counting fingers into and out of engagement with their co-operating magazine plates 22. In the use of the counting devices, provision is made for moving the fingers 39 rearwardly along the plates 22, when in engagement therewith so as to separate the majority of the hairpins H from the measured quantities at the extreme lower ends of said magazine plates. For this purpose a rock shaft 45 is journally mounted over the magazine plates 22, and has a pair of cranks 46 extending therefrom and connected with the hanger arms 30 by links 47. Movement of the rock shaft 45 is procured through a pair of operating levers 48, which are connected at their forward ends by a handle rod 49, these levers being extended such a distance from the rock shaft 45 as to permit the end of the rod 49 to readily clear the handwheel 29. A pulley 50 is also fixed from the rock shaft 45 and has a cable 51 trained therearound and secured thereto at one end, the opposite end having a counter balance weight 52 connected thereto. This weight 52 is used for the purpose of holding the parts in any position to which they have been moved as the result of operation of the handle rod 49.

After a quantity of hairpins have been counted off and separated from the main supplies on each of the magazine plates 22, the selected hairpins are elevated above the upper edges of the magazine plates to permit the operator to more readily remove and package the same. The lower front ends of each of the magazine plates 22 are cut out as at 53, thereby forming recesses in which a transversely disposed elevating strip 54 may move. In other words this strip extends between the side ends of the magazine frame 24 and adjacent the front plate 23, and while normally located a considerable distance below the lower ends of the hair-pins H, is readily raised to contact therewith to move the same above the magazine plates. All of the counted quantities of hairpins are simultaneously engaged and elevated by the strip 54 when the same is raised by the rocking of cam fingers 55, the same being fixed on short rock shafts 56, which extend through the end plate 23 and have cranks 57 on their outer ends. These cranks are connected by a bar 58, the central portion of which carries an operating handle 59, while one end is connected through a chain or the like 60 with a counter balance weight 61, the chain being trained over a pulley 62 as shown. The amount of elevation of the strip 54 is variable and readily controlled through an adjustable stop plate 63, said plate being mounted upon the end plate 23 and arranged in position to be engaged by one of the cranks 57.

The counting and associated mechanisms are all operated by a single operator seated on a stool or the like in front of the machine as shown in Figure 1. After a considerable supply of hairpins have been fed from the separating table 1 on to each of the magazine plates 22, the operator gives the handwheel 29 a slight rotation to throw the pivot point of the upper end of the pitman past the normal dead center, after which the weight of the counting mechanisms will cause the counting fingers 39 to contact with the upper edges of the magazine plates 22 between certain of the hairpins H thereon. The number of hairpins between each of the fingers 39 and the end plate 23 will be the same on each of the magazine plates 22 and will depend upon the position of the carrying bar 31, it being obvious that if the distance through which the fingers 39 are forced to move before coming in contact with the magazine plates 22 is varied, the number of hairpins counted off will be likewise changed. In the present device provision is made for changing the count of the hairpins by adjusting arm 36 by means of screw 39.

The next operation is to separate the counted quantities of hairpins from the main supplies on the magazine plates, and this is accomplished as hereinbefore indicated by moving the fingers 39 rearwardly while in contact with the edges of said plates. To obtain such movement, the operator moves the handle rod 49 from the normal inactive position as shown in Figure 4 to the operative position as shown in Figure 1. Movement of the parts is limited by the engagement of one of the hanger arms 30 with a stop 65, but the hairpins are thereby shifted sufficiently to clear the cutout portions 53 and eliminate the possibility of any of the uncounted hairpins being engaged by the elevating strip 54.

The third operation which the operator performs is the actuation of the elevating mechanism through the movement of the handle 59. This raises the strip 54 and all of the counted quantities of hairpins are raised above their magazine strips. After all of the elevated quantities of hairpins are removed and packaged, or otherwise disposed of, all of the parts are manually returned to their usual positions, and the hereinbefore described operations repeated.

I claim:

1. In a machine of the class described, an article magazine, means for segregating a predetermined number of articles from the total, means for moving the remainder of the articles away from the selected articles, and means for removing the selected articles from the magazine.

2. In a machine of the class described, a plurality of article magazines, means for simultaneously segregating a predetermined number of articles from the total on each of said magazines, and means for removing selected articles from the several magazines.

3. In a machine of the class described, a plurality of article magazines, means for segregating a predetermined number of articles from the total on each of said magazines, means for simultaneously moving the remainder of the articles on each of said magazines away from the selected articles on the corresponding magazines, and means for removing the selected articles from the several magazines.

4. In a machine of the class described, an article magazine, means for segregating a predetermined number of articles from the total, means for moving the remainder of the articles away from the selected articles, and means for elevating the selected articles above the magazine to facilitate removal.

5. In a machine of the class described, an article magazine, means for segregating a predetermined number of articles from the total, means for moving the remainder of the articles away from the selected articles, means for elevating the selected articles above the magazine to facilitate removal, and means for varying the degree of elevation of said articles.

6. In a machine of the class described, an article magazine plate having a number of articles disposed thereon in abutting relation, means movable between certain of said articles to separate a predetermined number from the total, means for sliding the remainder of the articles along said plate to separate the same from the selected articles, and means for elevating the selected articles above said plate to facilitate removal.

7. In a machine of the class described, a receiving and separating table adapted to have articles move thereover, a magazine at the discharge end of the table, an oscillatory bar pivoted intermediate its ends, and means for rocking the bar to alternately bring its opposite ends into striking engagement with the table.

In testimony that I claim the foregoing I have hereunto set my hand at Appleton, in the county of Outagamie and State of Wisconsin.

HOMER P. SMITH.